(12) United States Patent
Andonieh et al.

(10) Patent No.: US 11,496,953 B2
(45) Date of Patent: Nov. 8, 2022

(54) DISTRIBUTED ACCESS POINTS FOR WIRELESS NETWORKS

(71) Applicant: PERASO TECHNOLOGIES INC., Toronto (CA)

(72) Inventors: Joseph Andonieh, Aurora (CA); Bradley Robert Lynch, Toronto (CA); Ali Imran, Mississauga (CA); Arie Elazar, Maple (CA); Jeffrey Andonieh, East Gwillimbury (CA)

(73) Assignee: PERASO TECHNOLOGIES INC., Toronto (CA)

( * ) Notice: Subject to any disclaimer, the term of this patent is extended or adjusted under 35 U.S.C. 154(b) by 112 days.

(21) Appl. No.: 17/150,324

(22) Filed: Jan. 15, 2021

(65) Prior Publication Data

US 2021/0219214 A1    Jul. 15, 2021

Related U.S. Application Data

(60) Provisional application No. 62/961,395, filed on Jan. 15, 2020.

(51) Int. Cl.
| | |
|---|---|
| *H04W 12/0431* | (2021.01) |
| *H04W 48/16* | (2009.01) |
| *H04W 12/041* | (2021.01) |
| *H04L 1/16* | (2006.01) |
| *H04W 48/20* | (2009.01) |
| *H04W 68/00* | (2009.01) |
| *H04W 76/11* | (2018.01) |
| *H04W 84/12* | (2009.01) |

(52) U.S. Cl.
CPC ........... *H04W 48/16* (2013.01); *H04L 1/1642* (2013.01); *H04W 12/041* (2021.01); *H04W 12/0431* (2021.01); *H04W 48/20* (2013.01); *H04W 68/005* (2013.01); *H04W 76/11* (2018.02); *H04W 84/12* (2013.01)

(58) Field of Classification Search
CPC .............. H04W 48/16; H04W 12/041; H04W 12/0431; H04W 48/20; H04W 68/005; H04W 76/11; H04W 84/12; H04W 88/08; H04L 1/1642; H04L 2001/0093; H04L 2001/0097
See application file for complete search history.

(56) References Cited

U.S. PATENT DOCUMENTS

2020/0045555 A1 *   2/2020   Huang ................... H04W 4/06

* cited by examiner

*Primary Examiner* — Said M Elnoubi
(74) *Attorney, Agent, or Firm* — Perry + Currier

(57) ABSTRACT

A host controller for a distributed wireless local area network (WLAN) includes: a communications interface connected to each of a set of wireless access points (APs); a memory storing (i) identifiers of each of the wireless access points, and (ii) a master identifier of the host controller; and a processor configured to: receive a notification, from a first one of the APs, that the first AP has completed an association with a client device; in response to receiving the notification: deploy association data, including an identifier of the client device, to each of the APs; initiate a handshake mechanism with the client device, via a selected one of the APs, to generate an encryption key; and provide the encryption key to each or the APs to enable data exchange between the client device and each of the APs.

18 Claims, 3 Drawing Sheets

DISTRIBUTED ACCESS POINTS FOR WIRELESS NETWORKS

CROSS-REFERENCE TO RELATED APPLICATION

This application claims priority from U.S. provisional patent application No. 62/961,395, filed Jan. 15, 2020, the contents of which is incorporated herein by reference.

FIELD

This specification relates generally to wireless communications, and specifically to a system and method for implementing distributed access points for wireless networks.

BACKGROUND

Wireless local-area networks (WLANs), such as those based on the 802.11 family of standards, may be established using multiple access points to provide coverage extending over a larger area than can be achieved with a single access point. Further, such networks may be deployed by assigning a common network name to the full set of access points, allowing client devices to connect to the same WLAN throughout the coverage area. However, a client device travelling through the coverage area of such a network may be within range of distinct physical access points at different times. The client device may therefore be required to roam between such access points to maintain connectivity. Roaming may result in interruptions to communication sessions at the client device.

SUMMARY

According to an aspect of the specification, a host controller for a distributed wireless local area network (WLAN) is provided, including; a communications interface connected to each of a set of wireless access points; a memory storing (i) identifiers of each of the wireless access points, and (ii) a master identifier of the host controller; and a processor configured to: receive a notification, from a first one of the wireless access points, that the first access point has completed an association with a client device; in response to receiving the notification: deploy association data, including an identifier of the client device, to each of the wireless access points; initiate a handshake mechanism with the client device, via a selected one of the wireless access points, to generate an encryption key; and provide the encryption key to each or the wireless access points to enable data exchange between the client device and each of the access points.

According to another aspect of the specification, a method at a host controller for a distributed wireless local area network (WLAN), includes: connecting to a set of wireless access points; storing (i) identifiers of each of the wireless access points, and (ii) a master identifier of the host controller; receiving a notification, from a first one of the wireless access points, that the first access point has completed an association with a client device; in response to receiving the notification: deploying association data, including an identifier of the client device, to each of the wireless access points; initiating a handshake mechanism with the client device, via a selected one of the wireless access points, to generate an encryption key; and providing the encryption key to each or the wireless access points to enable data exchange between the client device and each of the access points.

BRIEF DESCRIPTIONS OF THE DRAWINGS

Embodiments are described with reference to the following figures, in which.

DETAILED DESCRIPTION

Figure 1:
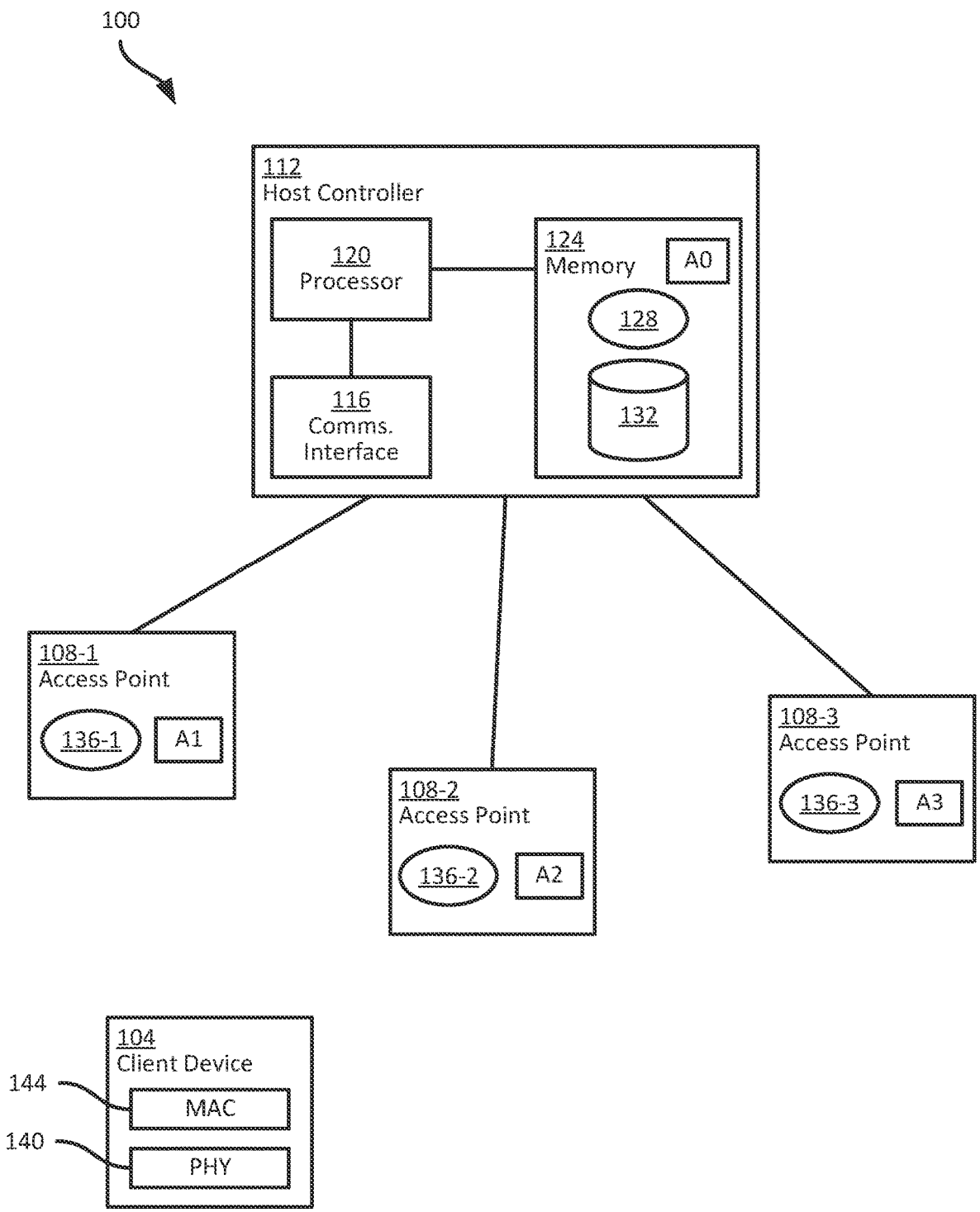
FIG. 1 is a diagram of a system for implementing a distributed access point.

FIG. 1 illustrates a system 100 for implementing a distributed wireless area network (WLAN), such as a WiFi network based on a suitable one of the 802.11 family of standards. As will be apparent to those skilled in the art, a WLAN generally includes at least one access point (AP), such as a router or other fixed AP deployed in a facility, or any other suitable computing device capable of acting as an AP. The physical area covered by the WLAN (that is, the area within which the WLAN is accessible to client computing devices such as smart phones and other mobile devices) can be extended by deploying additional APs, each associated with the same network identifier (e.g. the same service set identifier, SSID).

In deployments with multiple APs, a client device may enabled to traverse the larger area of coverage represented by the combined coverage areas of the APs, with minimal interruption to any communications conducted by the client device over the WLAN. However, interruptions may nevertheless result from the need for the client device to roam between APs within the WLAN, e.g. due to increasing distance from a given AP, or due to physical obstructions between the client device and the AP and the like. That is, at any given time in previous WLANs, a client device is associated with a given AP. To begin communicating via a different AP, the client device initiates a roaming process to disassociate from one AP and associate with another AP. In addition to imposing communications overhead on the client device, the roaming process may result in degraded performance for ongoing communication sessions, particularly time-sensitive sessions such as voice or video calls.

As will be described herein, the system 100 implements certain components and associated functionality to enable a set of APs to behave as a single, distributed AP. That is, a client device 104 in the system 100 can communicate via the WLAN without maintaining persistent associations with any individual AP. The client device 104 can therefore move throughout the coverage area of the WLAN and exchange data with arbitrarily selected APs of the WLAN, without a roaming process to hand over from one AP to the next. As a result, the above-mentioned overhead on the client device is mitigated, and interruptions or communications performance degradation at the client device can also be mitigated.

In particular, the system 100 includes a set of APs 108-1, 108-2, and 108-3. As will be apparent, the system 100 can include a smaller or greater number of APs in other examples (e.g. as few as two APs, and up to hundreds or thousands of APs). Each AP 108 is specifically (and uniquely, within the system 100) identified by a basic service set identifier (BSSID), which may be a media access control (MAC) address of the relevant AP 108. Such identifiers are referred to herein as specific identifiers. As shown in FIG. 1, the AP 108-1 has a specific identifier "A1", the AP 108-2 has a specific identifier "A2", and the AP 108-3 has a specific identifier "A3".

The system 100 also includes a host controller 112, also referred to herein simply as the host 112, including a communications interface 116 connecting the host 112 with each of the APs 108. For example, the interface 116 may implement, or be connected to, an Ethernet switch or the like to which each of the APs 108 are also connected. The host 112 can also be connected, via the interface 116, to a wide area network (not shown). In other examples, the functionality implemented by the host 112 may be implemented by one of the APs 108 instead of as a distinct computing device as shown in FIG. 1.

The host 112 includes a processor 120 interconnected with a non-transitory computer readable storage medium, such as a memory 124, having stored thereon various computer readable instructions for performing various actions. The memory 124 includes a suitable combination of volatile memory (e.g. Random Access Memory or RAM) and non-volatile memory (e.g. read only memory or ROM, Electrically Erasable Programmable Read Only Memory or EEPROM, flash memory). The processor 120 and the memory 124 include one or more integrated circuits.

The memory 124 stores instructions executable by the processor 120 to implement the distributed AP mentioned above. In particular, the memory 124 stores a host application 128 that, via execution by the processor 120, configures the APs 108 to enable the client device 104 to conduct communications via any of the APs 108 without the need to disassociate with one AP 108 and associate with another AP 108.

The memory 124 also stores a repository 132 containing the specific identifiers of the APs 108, as well as data identifying any client devices associated with the APs 108 (as a set, rather than any individual AP 108). The memory 124 also stores an identifier of the host 112 itself, which also acts as an identifier of any of the APs 108. The identifier, indicated as "A0" in FIG. 1, may be, for example, a MAC address of the host 112, or any other suitable string that uniquely identifies the host 112 within the system 100. The identifier A0 is also referred to herein as the master identifier or master BSSID of the system 100.

Configuration and control of the APs 108 by the host 112 is enabled by the interface 116 and the application 128 at the host 112, and by agent applications 136-1, 136-2, and 136-3 at the respective APs 108. As will be described below, the agents 136 configure the APs 108 to forward certain data to the host 112, and to receive commands and other information from the host 112. Such commands and other information enable the APs 108 to implement a single logical (although physically distributed) access point.

The client device 104 includes a communications interface that contains, among other components, a physical controller 140 and a MAC controller 144. In some examples the functions implemented by the controllers 140 and 144 can be combined in a single controller, but are illustrated separately in FIG. 1 for clarity. As will be apparent to those skilled in the art, the physical controller 140 establishes and controls physical access to links between the client device 104 and the access points 108. The MAC controller 144, meanwhile, receives data from, and sends data to, the physical controller 140, and interacts with other higher-level components of the client device 104, including application-level components and software.

As will be seen below, the system 100 enables the MAC controller 144 of the client device 104 to interact with a single logical AP with the identifier A0. That is, the MAC controller 144 need not be aware of the specific identifiers of the APs 108, and need not establish specific associations with any particular AP 108. The physical controller 140 of the client device 104 interacts with individual APs 108, using either or both of the master identifier A0 and the relevant specific identifier, and may arbitrarily select any AP 108 with which to exchange data at any time. More specifically, the physical controller 140 may change which AP 108 data is sent to or received from without initiating any roaming mechanism or otherwise associating with any particular AP 108. Changes to which AP 108 is employed to send and receive data by the client device 104 are, in other words, transparent to the MAC controller 144 (and therefore also to all higher-level functions at the client device 104).

Figure 2:
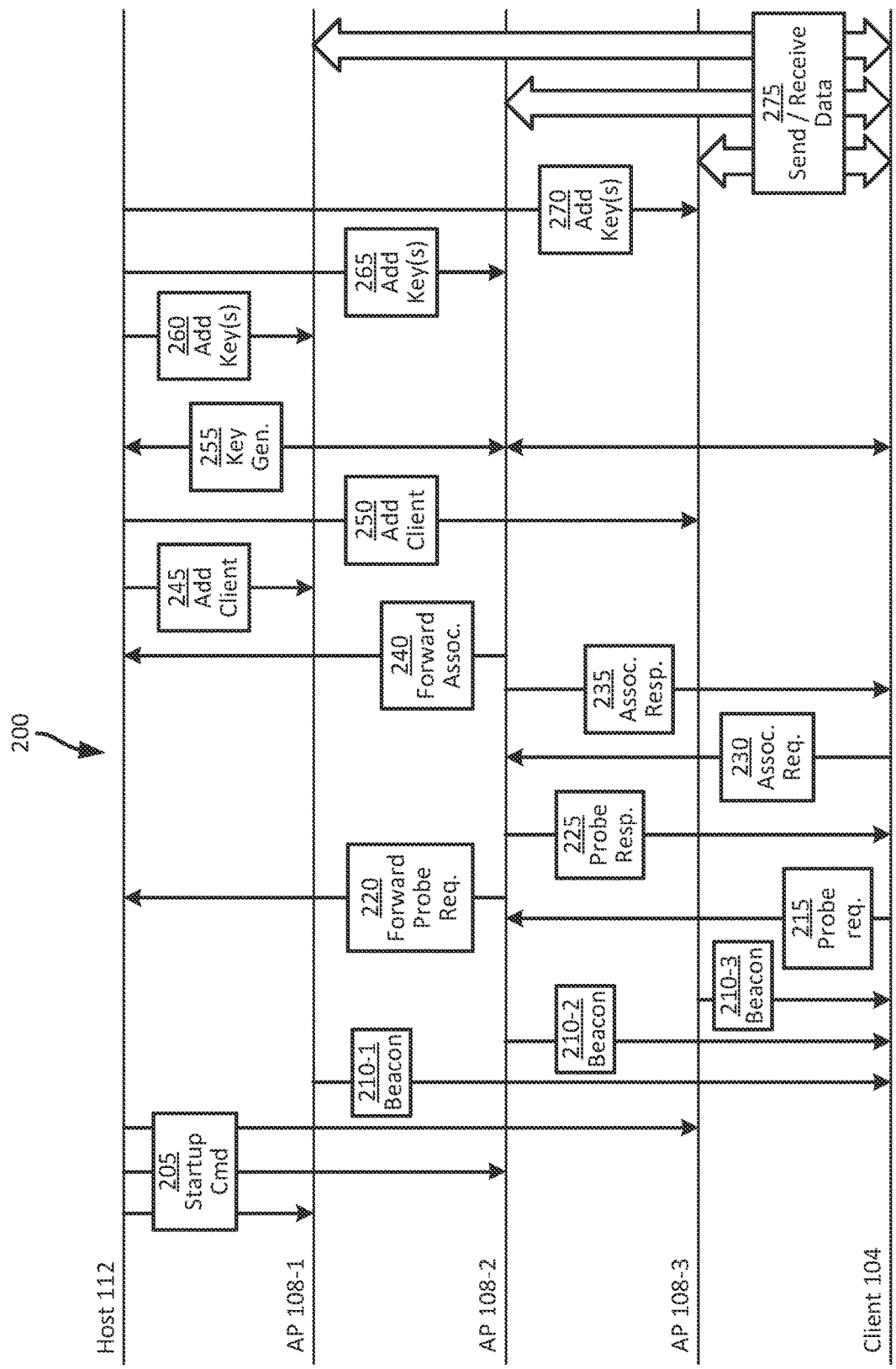
FIG. 2 is a flowchart of a method for connecting a client device to the distributed access point of FIG. 1.

Turning to FIG. 2, a method 200 of implementing a distributed WLAN is illustrated. The method 200 will be described below in conjunction with its performance in the system 100. As set out below, the method 200 configures the client device 104 and the APs 108 to permit the client device 104 to exchange data with any one of the APs 108 at any time, without roaming procedures.

At block 205, the host 112 is configured to initialize operation of the system 100 by sending a startup command to the APs 108. For example, the host 112 can retrieve identifiers of the APs 108 (e.g. the specific identifiers A1, A2, and A3) from the repository 132, and transmit the startup command to each AP 108, for processing by the respective agent 136. Upon receiving the startup command, each agent 136 is configured to begin operation of the AP 108, e.g. by issuing a startup command to a local MAC controller of the AP 108.

Following startup, each AP 108 is configured to periodically emit a beacon at block 210 (shown in FIG. 2 as instances 210-1, 210-2, and 210-3, corresponding to the respective APs 108). The beacons emitted by each AP 108 enable client devices in the system 100, including the client device 104, to detect and connect to available networks. Each beacon contains various information enabling such detection and connection, including the specific identifier of the corresponding AP 108. That is, at block 210-1, the AP 108-1 emits a beacon containing the specific identifier A1. Likewise, at block 210-2 the AP 108-2 emits a beacon containing the specific identifier A2, and at block 210-3 the AP 108-3 emits a beacon containing the specific identifier A3. The beacons need not be emitted in the same sequence as shown in FIG. 2. For example, the beacons may be emitted by the APs 108 simultaneously, or according to distinct schedules, in other examples.

The client device 104, in order to connect to the WLAN, detects at least one of the above beacons. In the illustrated example, the client device 104 is assumed to detect al three of the beacons, and to select the beacon with the greatest signal strength. In some examples, the client device 104 can perform a sector sweep (SSW) with the AP 108 corresponding to the selected beacon, although such a process is not shown in FIG. 2. Beamforming procedures may also be implemented following block 210 in some examples. The client device 104 then sends, at block 215, a probe request frame to the selected AP 108. The probe request is formatted according to the implementing standard of the WLAN. In particular, the probe request is addressed to the specific identifier of the AP 108; in the illustrated example, therefore, the probe request is addressed specifically to the AP 108-2, using the identifier A2.

At block 220, having received the probe request, the AP 108-2 forwards the probe request to the host 112 (via the agent 136-2). In some examples, block 220 may be omitted. At block 225, the AP 108-2 generates and sends a probe response to the client device 104. The content and format of the probe response is defined by the relevant implementing standard for the WLAN, but also includes the master identifier A0 instead of, or in addition to, the specific identifier A2. Thus, the client device 104 obtains, while connecting to the WLAN, the master identifier A0 from whichever AP 108 is contacted by the client device 104. The client device 104 can also receive, e.g. in the probe response, the specific identifiers of the other APs 108 in the system 100. For example, the probe response can include a table containing each of the specific identifiers and the master identifier, for storage at the client device 104.

In other examples, rather than explicitly providing each identifier A0, A1 A2, and A3 to the client device 104, the probe response can contain a mask definition enabling the client device 104 to derive the above identifiers from any of the specific identifiers. The mask definition may specify, for example, a shared prefix that is common to all the above-mentioned identifiers, and a reserved suffix that corresponds to the master identifier A0. The specific identifiers of the APs 108 can be defined by combinations of the prefix and indexed suffixes, and the mask definition may therefore specify a number of APs 108 (i.e. a range for the above indexed suffixes).

Following receipt of the probe response, the PHY controller 140 of the client device 104 is configured to report the contents of the probe response to the MAC controller 144, e.g. for presentation to an application-level component, selection of a connection command by an operator of the client device 104, or the like. The information presented to the MAC controller 144, however, does not include the specific identifier A2 of the AP 108-2, or any other specific identifier of the APs 108. Instead, the probe response is modified prior to presentation to the MAC controller 144, to include the master identifier A0 instead of any specific identifier.

At block 230, for example in response to a command from an operator of the client device 104, the client device 104 is configured to send an association request to one of the APs 108. As noted above, the MAC controller 144 and any higher-level components of the client device 104 are exposed only to the master identifier A0. The association request is therefore initiated, e.g. via a command from the MAC controller 144, using the master identifier A0. The PHY controller 140, upon receiving the command, can address the association request to either the master identifier A0, or to a specific identifier corresponding to one of the APs 108. Each AP 108 forwards data addressed either to its own specific identifier or to the master identifier, to the host 112.

In the illustrated example, the client device 104 sends the association request to the AP 108-2, from which the probe response was received. In other examples, however, the association request can be sent to a different one of the APs 108. For example, the client device 104 can perform a further scan, and select another AP 108 based on signal strength. As noted earlier, the client device 104 previously received and stored the specific identifiers of the APs 108 as well as the master identifier, and can therefore determine which APs 108 are members of the distributed WLAN.

At block 235, having received the association request, the AP 108-2 returns an association response indicating success or failure of the association. Either or both of the AP 108-2 and the host 112 can determine whether the association is to be accepted (that is, the AP 108-2 can also forward the association request itself to the host 112 and await a decision from the host 112 before block 235, in some examples). The decision of whether to accept or deny the association can be made based on whitelists or blacklists of device identifiers, or other device profile information (e.g. specifying types of devices).

When the association is successful, the AP 108-2 also, at block 240, forwards a notification of the association to the host 112. The notification includes at least an identifier of the client device 104 (e.g. a MAC address of the client device 104). The notification can include, in some examples, a copy of the association response from block 235.

As will now be apparent, following the performance of block 235, the client device 104 is associated with the AP 108-2, but the remainder of the system 100 is not yet provisioned to enable the client device 104 to communicate via the other APs 108 without establishing associations with those APs 108. Further, security data such as encryption keys have not yet been provisioned. The host 112, in response to the notification from block 240, is configured to deploy association data including at least an identifier of the client device 104, to each of the other APs 108 (that is, other than the AP 108 from which the notification was received).

Deployment of the association data includes sending association data to the AP 108-1 at block 245, and to the AP 108-3 at block 250. The APs 108, upon receiving the association data, are configured to store the association data locally, such that future interactions between those APs 108 and the client device 104 do not require separate association processes.

Following the deployment of association data, at block 255 the host 112 initiates the generation of one or more encryption keys, e.g. via a 4-way handshake process, an 8-way handshake process, or other suitable key-generation mechanisms. The handshake process is conducted by an exchange of data between the host 112 itself and the client device 104. However, there is no direct link between the host 112 and the client device 104. Instead, the exchange of data occurs via a selected one of the APs 108. Generally, the selected AP 108 is the AP 108 from which the notification was received at block 240. In some examples, however, the host 112 can select another one of the APs 108 to use for the exchange at block 255.

The generation of encryption keys at block 255 results in the generation of a set of keys using the client identifier and the master identifier A0 of the host 112. At blocks 260, 265, and 270, the host 112 is configured to provide the encryption key(s) to each of the APs 108-1, 108-2, and 108-3, respectively. Thus, each of the APs 108 is provisioned for communication with the client device 104 at block 275, without requiring disassociation from one AP 108 and association with another AP 108. That is, at block 275 the client device 104 can arbitrarily select any of the APs 108 to which to send data. The selection of an active AP 108 at the client device can be based, for example, on signal strength measurements derived from beacons or other transmissions. In some examples, selection of an active AP 108 can be based on heartbeat signals received from the APs 108, beamforming processes with the APs 108, and the like. In further examples, the APs 108 or the host 112 can issue commands to the client device 104 instructing the client device 104 to use a certain AP 108, e.g. for load balancing or in the event of an outage of an AP 108.

Figure 3:
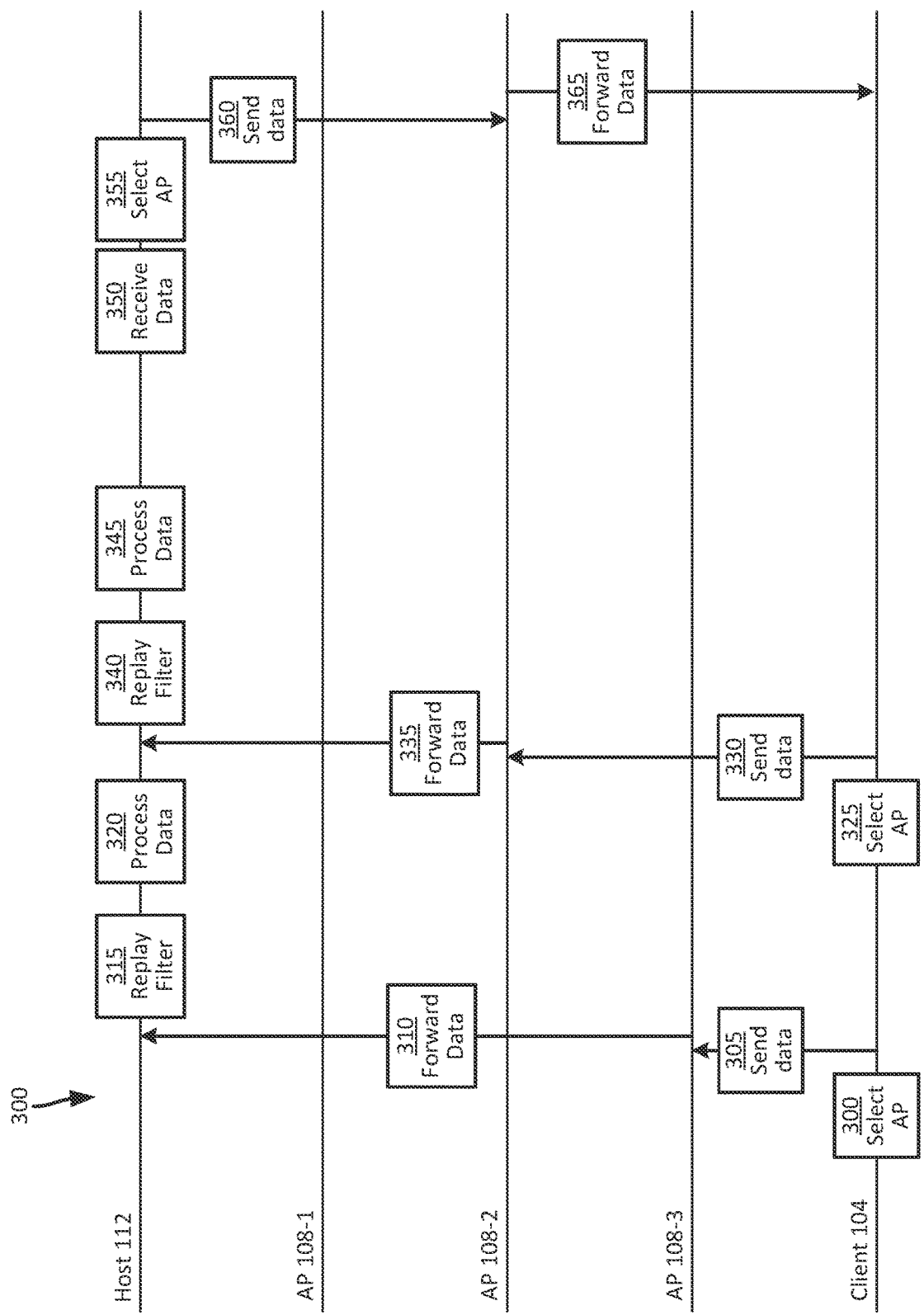
FIG. 3 is a flowchart of a method for exchanging data between the client device and the distributed access point of FIG. 1.

Turning to FIG. 3, a method 300 illustrating communications between the client device 104 and the APs 108 following association according to the method 200 is shown.

For upstream data, sent from the client device 104 to the WLAN, e.g. for transmission to the previously mentioned WAN, at block 300 the client device 104 can select a specific AP 108. It will be understood that the selection at block 300 is performed by the PHY controller 140, while the MAC controller 144 is not aware of the existence of multiple APs 108. That is, any data generated for transmission by the MAC controller 144 is addressed simply to the master identifier A0. The PHY controller 140 may, at block 300, select an active one of the APs 108 based on signal strength or the lke. In other examples, block 300 may be omitted, e.g. if the client device 104 uses an omnidirectional antenna and does not perform beamforming.

At block 305, the client device 104 sends the data to the selected AP 108, by addressing the frame(s) for transmission either using the master identifier or the specific identifier of the AP 108 selected at block 300. In the illustrated example, the data is sent to the AP 108-3 at block 305. At block 310, the AP 108-3 forwards the data received from the client device 104 to the host 112, via the agent 136-3. The host 112, at block 315, may implement a replay detection filter, to mitigate against attacks in which a frame intercepted by an attacker is replayed to another AP 108 that did not receive the original frame. For example, each frame transmitted by the client device 104 may include a sequence number (e.g. a 64-bit string). The host 112 can store the sequence number of the most recently processed frame from the client device 104, and can determine whether the sequence number of the frame received via block 310 is smaller than or equal to the stored sequence number. When such a determination is affirmative, the frame is a duplicate of a previously received frame, and is dropped by the host 112.

At block 320, if the replay filter detection at block 315 does not result in the frame being dropped, the host 112 processes the frame, e.g. by sending the frame to another device for delivery to its destination.

A further transmission from the client device 104 is also illustrated in FIG. 3, beginning at block 325. Specifically, as described above, at block 325 the client device 104 selects an AP 108, and at block 330 the client device 104 sends data to the selected (active) AP 108. As will now be apparent, the data sent at block 330 is sent to the AP 108-2, rather than the AP 108-3. Despite switching from one AP 108 to another, the client device 104 did not complete a dissociation from the AP 108-3 or association with the AP 108-2. In other words, the client device 104 is not required to roam between APs 108 in order to transmit or received data to or from different APs 108. Instead, the MAC controller 144 of the client device 104 uses only the master identifier A0, and the PHY controller 140 can select any AP 108 arbitrarily.

As described earlier, the AP 108-2 forwards the data to the host 112 at block 335, and the host 112 performs the above-mentioned replay detection at block 340 and processing at block 345. The processes described above can be repeated as needed for additional data sent by the client device 104.

FIG. 3 also illustrates the transmission of data to the client device 104 from the host 112, e.g. following receipt of such data from the WAN mentioned earlier, or from another client device connected to the WLAN. In response to receiving the data addressed to the client device 104 at block 350, the host 112 is configured to select an active AP 108 at block 355. The active AP 108 can be the AP 108 from which the most recent communication from the client device 104 was received, for example. In other examples, the host 112 can select more than one of the APs 108 as active, e.g. to account for uncertainty in the location of the client device 104 within the system 100.

At block 360, the host 112 is configured to send the data to the selected AP(s) 108. In the illustrated example, the data is sent to the AP 108-2, which is the most recent AP 108 to which the client device 104 sent data (at block 330), The AP 108-2, in turn, is configured to forward the data to the client device 104.

The client device 104 (e.g. the PHY controller 140) can maintain sequence numbers corresponding to each of the APs 108, to perform relay attack detection and/or drop duplicate frames, similar to the functionality discussed above in connection with blocks 315 and 340.

As will be apparent to those skilled in the art, in some implementations, beamforming may periodically be initiated between the client device 104 and the APs 108. In some cases, beamforming may be initiated by two or more APs 108 simultaneously, such that the client device 104 receives beamforming signals from more than one AP 108 within a given period of time. In such instances, the client device 104 is configured to respond to beamforming signals from each AP 108 in sequence.

The scope of the claims should not be limited by the embodiments set forth in the above examples, but should be given the broadest interpretation consistent with the description as a whole.

The invention claimed is:

1. A host controller for a distributed wireless local area network (WLAN), the host controller comprising:
   a communications interface connected to each of a set of wireless access points;
   a memory storing (i) identifiers of each of the wireless access points, and (ii) a master identifier of the host controller; and
   a processor configured to:
      receive a notification, from a first one of the wireless access points, that the first access point has completed an association with a client device;
      in response to receiving the notification:
         deploy association data, including an identifier of the client device, to each of the wireless access points;
         initiate a handshake mechanism with the client device, via a selected one of the wireless access points, to generate an encryption key; and
         provide the encryption key to each or the wireless access points to enable data exchange between the client device and each of the access points.

2. The host controller of claim 1, wherein the master identifier is a basic service set identifier (BSSID); and wherein each access point identifier is a BSSID distinct from the master identifier.

3. The host controller of claim 1, wherein the processor is further configured, prior to receiving the notification, to send a startup command to each of the access points.

4. The host controller of claim 3, wherein the processor is configured to send the startup command via execution of a host application, for delivery to respective agent applications at the access points.

5. The host controller of claim 1, wherein the notification is received at the processor from an agent application executed at the one of the access points.

6. The host controller of claim 1, wherein the selected access point is the same as the first one of the access points.

7. The host controller of claim 1, wherein the processor is further configured, after deploying the encryption key, to receive upstream data from the client via any of the access points.

8. The host controller of claim 7, wherein each frame of upstream data includes a sequence number; and wherein the processor is further configured to:
   maintain a most recently processed sequence number;
   upon receiving a frame from one of the access points, determine whether the sequence number contained in the frame is smaller than or equal to than the most recently processed sequence number; and
   responsive to determining that the sequence number contained in the frame is smaller than or equal to than the most recently processed sequence number, discard the frame.

9. The host controller of claim 1, wherein the processor is further configured to:
   after deploying the encryption key, receive downstream data addressed to the client; and
   determine an active one of the access points, and send the data to the active access point for delivery to the client device.

10. A method at a host controller for a distributed wireless local area network (WLAN), the method comprising:
    connecting to a set of wireless access points;
    storing (i) identifiers of each of the wireless access points, and (ii) a master identifier of the host controller;
    receiving a notification, from a first one of the wireless access points, that the first access point has completed an association with a client device;
    in response to receiving the notification:
      deploying association data, including an identifier of the client device, to each of the wireless access points;
      initiating a handshake mechanism with the client device, via a selected one of the wireless access points, to generate an encryption key; and
      providing the encryption key to each or the wireless access points to enable data exchange between the client device and each of the access points.

11. The method of claim 10, wherein the master identifier is a basic service set identifier (BSSID); and wherein each access point identifier is a BSSID distinct from the master identifier.

12. The method of claim 10, further comprising: prior to receiving the notification, sending a startup command to each of the access points.

13. The method of claim 12, wherein sending the startup command includes executing a host application, and delivering the startup command to respective agent applications at the access points.

14. The method of claim 10, further comprising receiving the notification from an agent application executed at the one of the access points.

15. The method of claim 10, wherein the selected access point is the same as the first one of the access points.

16. The method of claim 10, further comprising, after deploying the encryption key, receiving upstream data from the client via any of the access points.

17. The method of claim 16, wherein each frame of upstream data includes a sequence number; and wherein the method further comprises:
    maintaining a most recently processed sequence number;
    upon receiving a frame from one of the access points, determining whether the sequence number contained in the frame is smaller than or equal to than the most recently processed sequence number; and
    responsive to determining that the sequence number contained in the frame is smaller than or equal to than the most recently processed sequence number, discarding the frame.

18. The method of claim 10, further comprising:
    after deploying the encryption key, receiving downstream data addressed to the client; and
    determining an active one of the access points, and send the data to the active access point for delivery to the client device.

* * * * *